United States Patent [19]
Stiffler

[11] Patent Number: 6,086,155
[45] Date of Patent: Jul. 11, 2000

[54] ROTARY SEAT ADJUSTMENT MECHANISM

[75] Inventor: Scott Stiffler, Indianapolis, Ind.

[73] Assignee: P.L. Porter Co., Woodland Hills, Calif.

[21] Appl. No.: 09/097,375

[22] Filed: Jun. 15, 1998

[51] Int. Cl.[7] .................................................... B60N 2/02
[52] U.S. Cl. ..................................... 297/362; 297/362.14
[58] Field of Search ............................. 297/362, 362.12, 297/362.14, 361.1

[56] References Cited

U.S. PATENT DOCUMENTS

| 3,738,706 | 6/1973 | Caldemeyer | 297/362 X |
| 3,814,475 | 6/1974 | Slabon et al. | 297/362.14 |
| 4,865,385 | 9/1989 | Suzuki | 297/362 |

FOREIGN PATENT DOCUMENTS

| 3002827 | 7/1981 | Germany | 297/362 |
| 3532295 | 3/1987 | Germany | 297/362 |

Primary Examiner—Laurie K. Cranmer
Attorney, Agent, or Firm—Oppenheimer Wolff & Donnelly LLP

[57] ABSTRACT

The rotary adjustment mechanism adjusts the seat back of a vehicle seat. The mechanism includes a handle mounted for rotation with respect to the seat. The handle has an internal gear, and the internal gear drives a pair of pinion gears positioned within the internal gear. Each gear rotates a flexible shaft, and each shaft connects to a leadscrew. The leadscrew has a threaded end, which mates with a threaded nut connected one seat pivot. Shaft rotation rotates the leadscrew, which causes the threaded nut to move axially, which in turn, pivots the respective seat pivot.

9 Claims, 4 Drawing Sheets

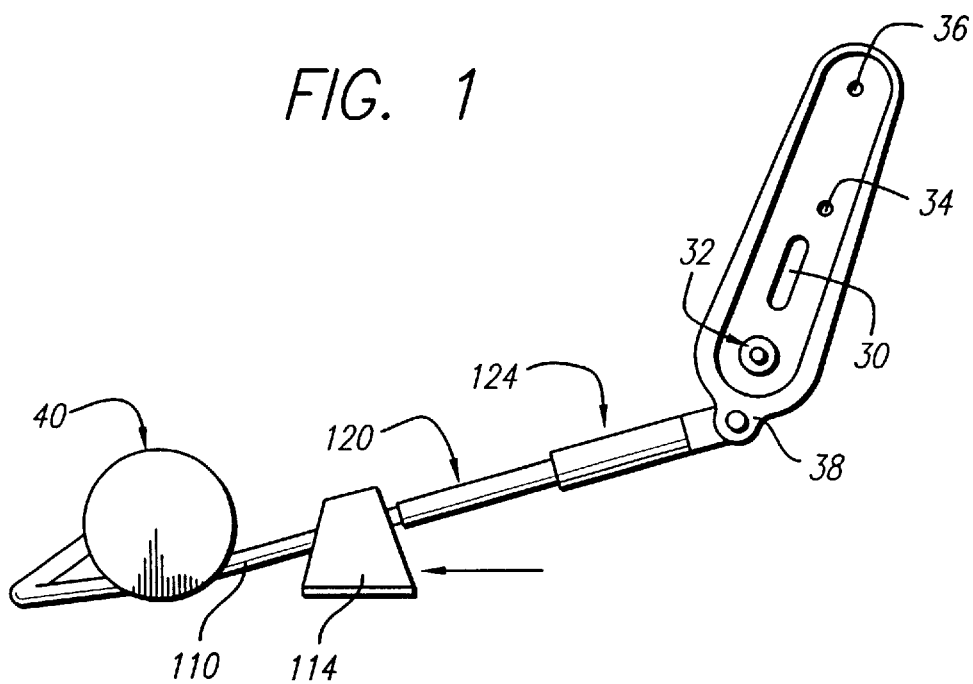
FIG. 1
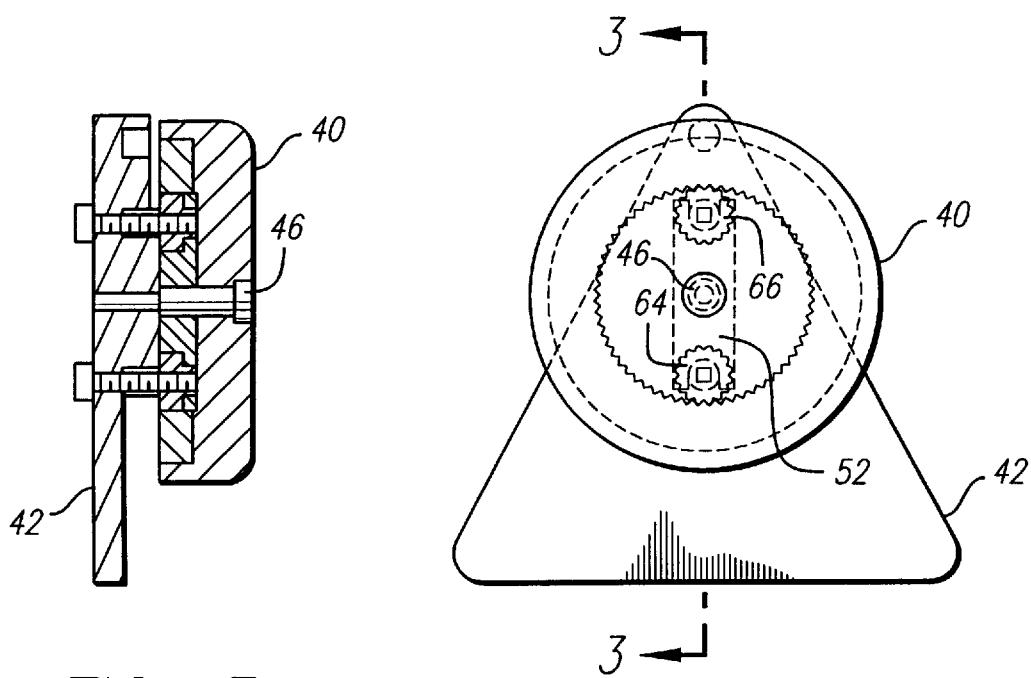
FIG. 3
FIG. 2

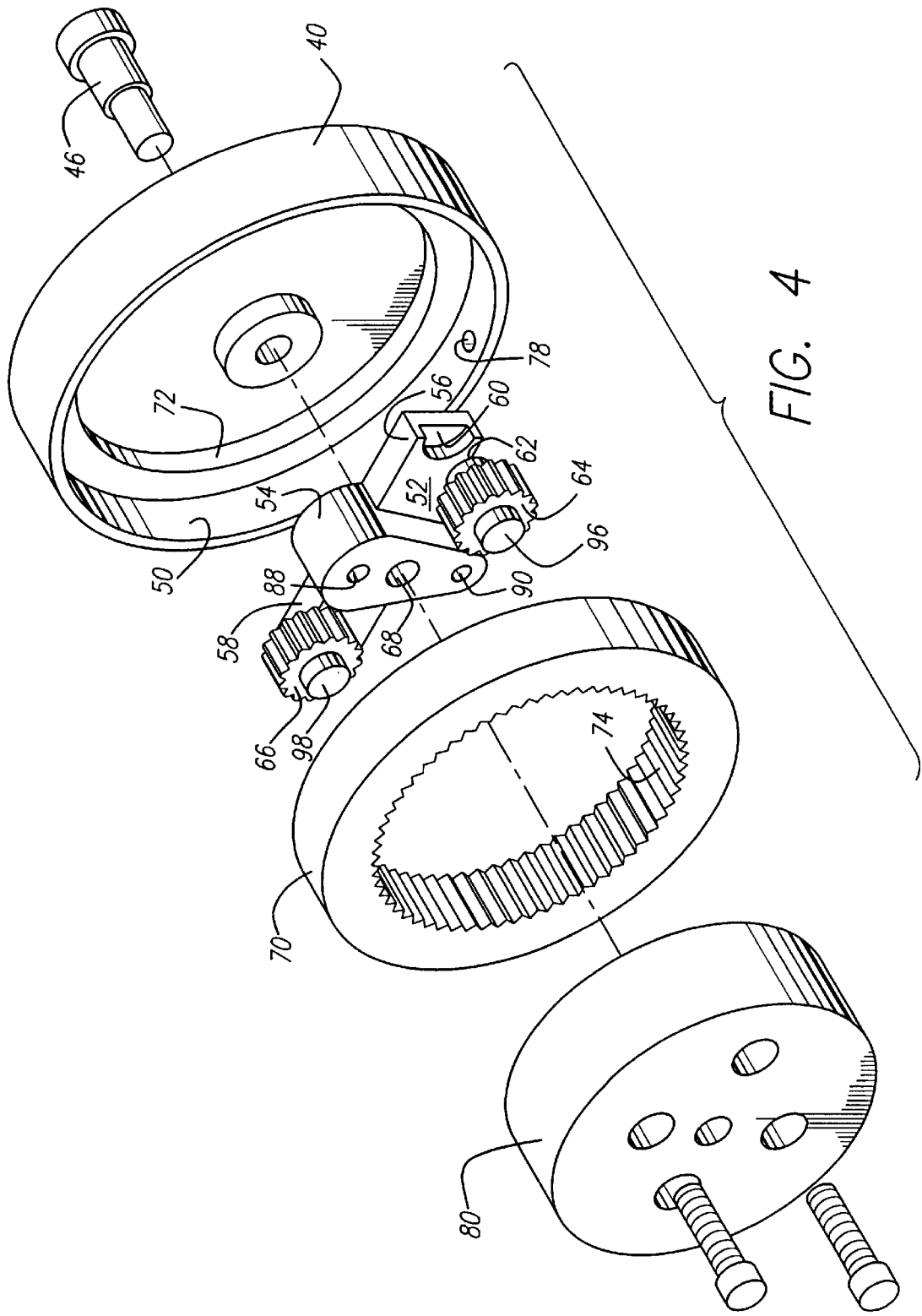

ROTARY SEAT ADJUSTMENT MECHANISM

BACKGROUND OF THE INVENTION

1. Field of the Invention

The present invention relates to seat adjustment mechanisms that use a rotating handle. Manually adjusting the incline of vehicle seats is their primary use.

2. State of the Art

Several manual systems may adjust vehicle seat backs. A common adjustment mechanism is a releasable lock. With that system, the person in the seat pulls or pushes on a lever, which in turn releases a lock. The person then either leans forward or backward until the seat is at a proper incline. He or she then releases the lever to relock the lock and secure the seat back.

Another common manual seat adjuster is a rotary handle. Instead of releasing the seat and relying on the person to lean to a preferred angle, the rotary handle affects the adjustment directly. The handle has a spur gear that engages a gear on the seat pivot. Handle rotation thuse causes the seat pivot to rotate. The commercial devices may be more complex, but a gear on the handle transmits rotary motion to the seat pivot. Systems like this are more common on European cars than on other vehicles.

Seats can be difficult to adjust using the prior art systems. The handle may be difficult to rotate. Once solution has been to change the gearing, but that often requires too many turns of the handle to effect desired seat recline. As loads increase, the previously mentioned problems becomes more crucial. Force from prior art handles can be applied unevenly on the gear. Also, the force from the rack can act unevenly on one side of the seat. The member that transmits force from the rack to both seat pivots must occupy a specific internal location within the seat, and that location may be inconvenient. The handle also may be located inconveniently for the user to reach.

SUMMARY OF THE INVENTION

The principal object of the present invention is to overcome these problems. One object is to disclose and provide an adjusting mechanism that rotates easily without binding and with a smooth operation. Another object is to disclose and provide an adjusting mechanism that provides an even force to each seat pivot. Another object is to provide increased seat back travel per handle revolution. Another object is to provide high load capacities.

Another object of the present invention is to maintain the seat back and the adjustment mechanism fully engages always. With the releasible handles adjustment, a crash can occur while the lock is not engages. The present invention, therefore, also acts as a lock to prevent seat back reclaining during a crash.

The rotary adjustment mechanism of the present invention includes a handle mounted for rotation with respect to We seat. The handle has an internal gear, and the internal gear drives a pair of pinion gears positioned within the internal gear. Each gear rotates a flexible shaft. Each shaft connects to a leadscrew. The threaded end of the leadscrew mates with a threaded nut connected one seat pivot. Shaft and leadscrew rotation causes the threaded nut to move axially, which in turn, pivots the respective seat pivot.

These and other objects of the invention may be seen more clearly from the detailed description of the preferred embodiment that follows.

BRIEF DESCRIPTION OF THE DRAWINGS

FIG. 1 is a side view of a portion of the adjustment mechanism of the exemplary embodiment of the present invention.

FIG. 2 is a front sectional view of the handle and its mounting for the adjustment mechanism of the exemplary embodiment of the present invention.

FIG. 3 is a side view taken through plane 3—3 of FIG. 2.

FIGS. 4 and 5 are perspective, exploded views of the handle and gear mechanism of the present invention.

DETAILED DESCRIPTION OF THE PREFERRED EMBODIMENT

Figure 6:
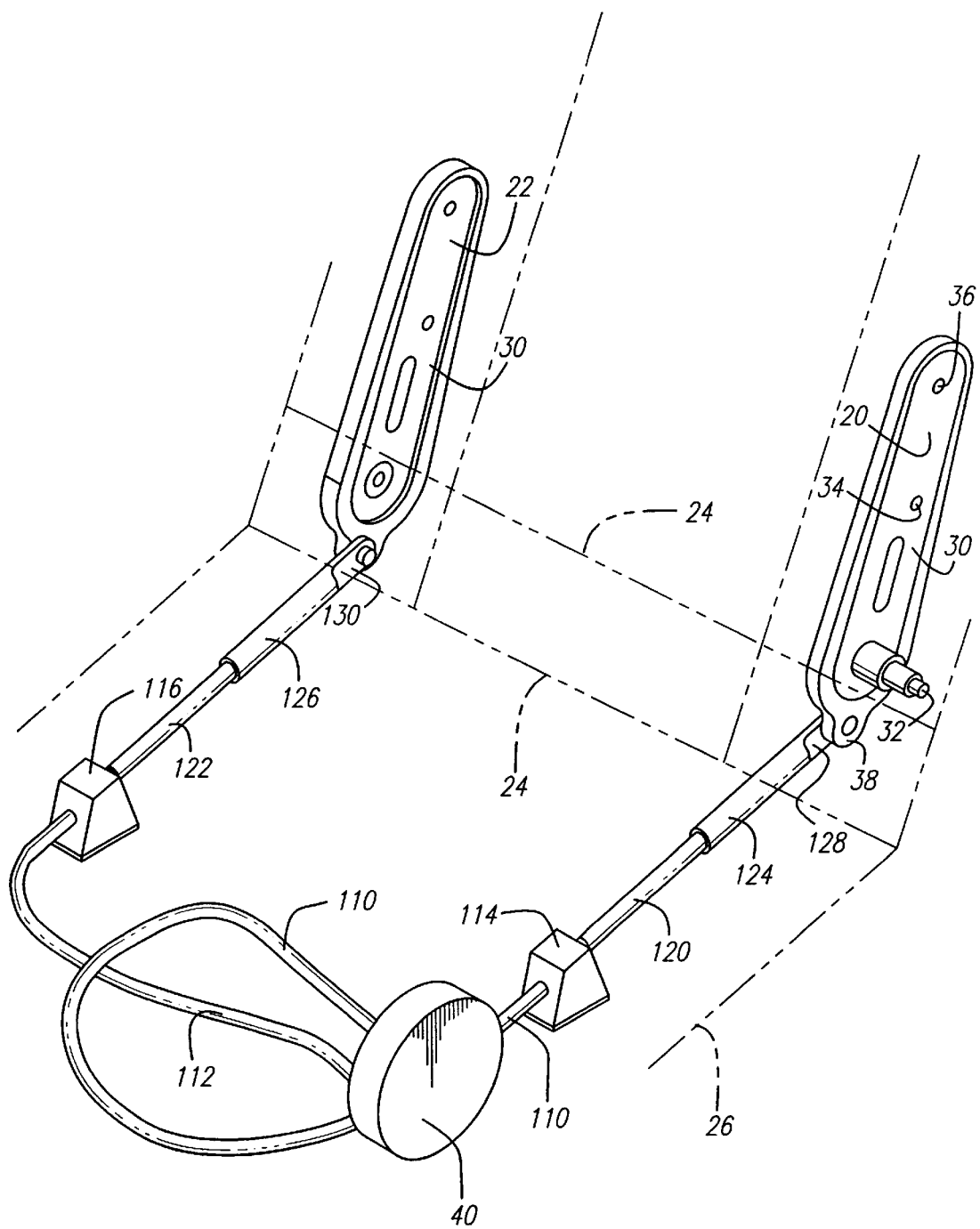
FIG. 6 is a perspective view of the adjustment mechanism of the exemplary embodiment of the present invention in a vehicle seat.

The vehicle seat of the present invention has a pair of seat pivots 20 and 22 (FIG. 6). They are within the seat back 24 (shown in phantom). FIG. 6 is the driver's seat of a left hand drive vehicle. Thus, seat pivot 20 is the left side of the seat looking forward (to the left in FIG. 6). The mechanism for the passenger seat is the mirror image of the mechanism of FIG. 6. Seat back 24 reclines about pivot points near the rear of the seat portion 26.

Seat pivots 20 and 22 each have a plate 30. The plate has a shape shown in FIGS. 1 and 6 that gives it strength with light weight. Each plate 30 has a pivot point 32. The top section of the plate has a pair of spaced holes 34 and 36 through which bolts (not shown) attach the plate to the seat back structure. Thus, pivoting plates 30 reclines seat back 24. Each plate 30 also has a flange 38 below the pivot point. As shown later, the mechanism that causes seat pivoting acts at the flange. The location shown in FIGS. 1 and 6 is preferred, but the mechanism that causes the seat to pivot can act elsewhere on the plates.

The mechanism that causes plates 30 to pivot comprises a handle 40 (FIGS. 1, 2, 3 and 6). The handle is the only part of the mechanism that is visible to the user without disassembling the seat. In the exemplary embodiment, the handle is plastic, but it may be other materials. The handle mounts to a frame member 42 that is fixed to the seat portion 26. Frame member 42 is shown as a triangle, but it may be any convenient shape to act as a secure member for mounting the handle.

Handle 40 rotates on a shaft 46 (FIGS. 2, 3, 4 and 5). The head of the shaft would be countersunk into the handle to be flush with the handle's outer surface 48. Alternatively, the shaft may may extend into the handle through the open side 50 without reaching the outer serface 48 of the handle. A short threaded portion of the shaft attaches to the frame member 42 to secure the shaft.

Figure 5:
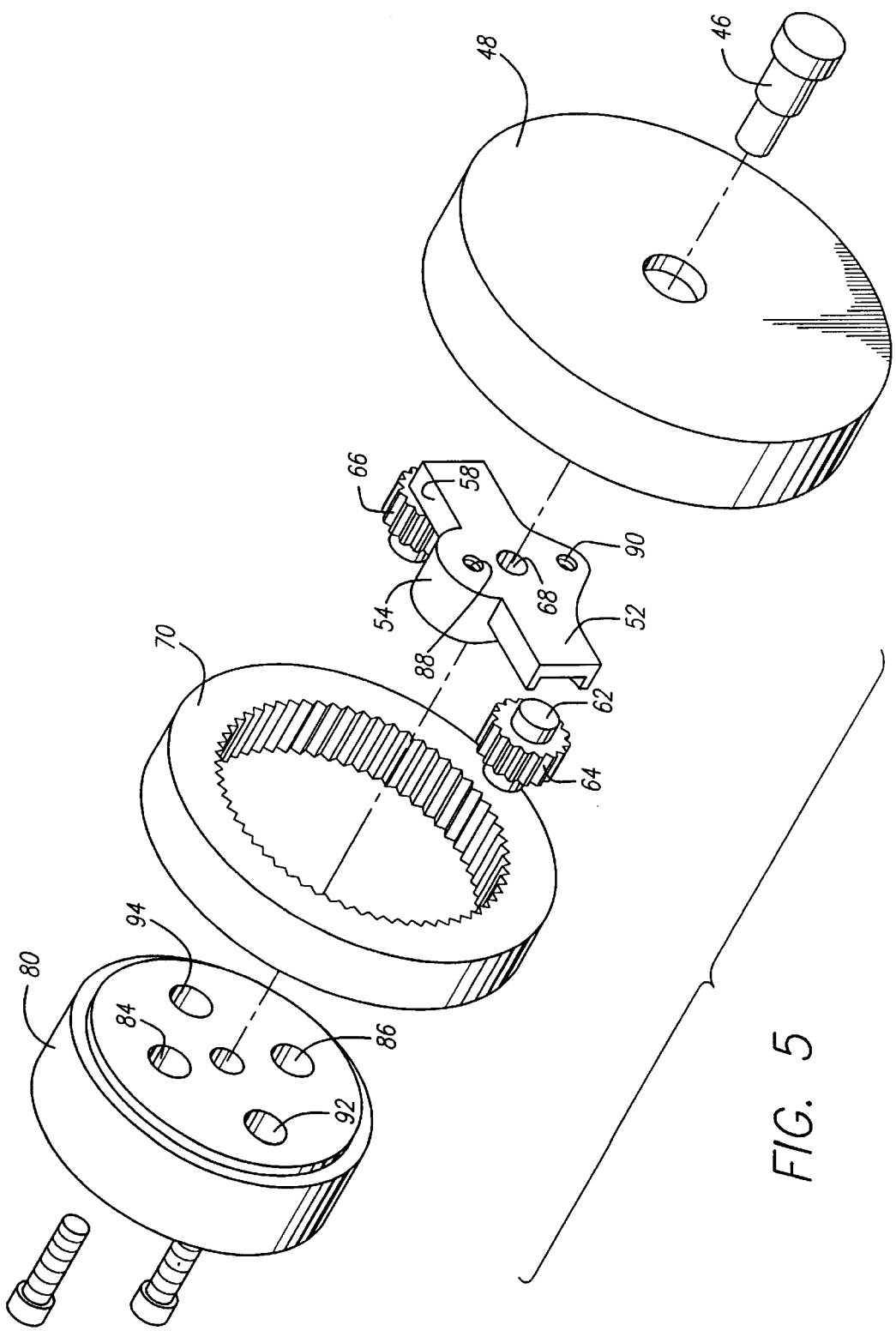

As FIG. 4 shows, handle 40 is cup shaped. The side 50 facing the frame member 42 is open to receive various parts. One part, bracket 52, has a center section 54 and two arms 56 and 58 extending in opposite directions from the center section (FIGS. 4 and 5). Each arm has a recess 60 (only one recess is visible in FIG. 4). Each recess receives a hub 62 on one of the pinion gears 64 and 66. The recesses are sized to permit pinion gear rotation without permitting the gears to move axially with respect to the center of the bracket 52. Shaft 46 also extends through a bore 68 through the center of the bracket.

Ring member 70 also fits within the open side 50 of handle 40. The outside diameter of the ring member is slightly smaller than the inside diameter of the handle's open side. The ring also rests against shoulder 72 (FIG. 4) inside the handle. The inside of ring 70 has internal gear teeth 74 that are sized to mesh with the teeth on pinion gears 64 and 66. Thus, when the handle and ring rotate, the internal gear 74 causes the pinion gears 64 and 66 to rotate. A set bolts (not shown), which extend through an opening in the handle, secures the ring member to the handle. Alternatively, the ring member may be attached to the handle by an adhesive. If the handle and ring member is the same plastic material, the ring may be formed as a single piece with the handle.

Block 80 has a recessed section 82 that has a small enough outside diameter to fit within ring member 70. Block 80 appears quite thick in the drawings. Applicant anticipates that it will be made thinner in later versions.

Two bolts extend through the plate 42 (not shown in FIGS. 4 and 5) and through bores 84 and 86 in block 80. The bolts attach to threaded openings 88 and 90 in bracket 52 (FIGS. 4 and 5). Openings 92 and 94 are aligned with the pinion gears 64 and 66. The openings are sized to receive hubs 96 and 98 on the pinion gears (FIG. 4). The openings extend completely through block 80 for reasons discussed below. Shaft 46 also extends through an opening 100 in the block 80.

Because block 80 is fixed to the fixed frame 42 and bracket 52 is fixed to the block, the bracket remains stationary as the handle 40 rotates. Consequently, the pinion gears also remain stationary but rotate as the handle rotates.

Each pinion gear 64 and 66 has a square opening that receives a square end of a flexible shaft 110 and 112 (FIG. 6). The openings and ends may be another shape as long as gear rotation positively rotates the flexible shafts. The flexible shafts allow the output of the gears to provide a rotary output at a remote location. One could replace the flexible shafts with a more complex output. For example, one could use a series of interconnected rigid shafts.

Returning to the flexible shaft embodiment, each shaft 110 and 112 extends to small plastic or aluminum housing 114 and 116. Each housing is fixed to the seat portion 26. Housing 114 is on the left side (facing forward) of the seat, and housing 116 is on the opposite side. The ends of the flexible shafts also are square, and a square hole in leadscrews 120 and 122 receives a square end of the shafts.

The leadscrews have outside threads that extend into and engage one of the elongated nuts 124 and 126. The nuts have internal threads that mesh with the leadscrews' external threads. As lead screws 120 and 122 rotate, elongated nuts 124 and 126 move axially along the leadscrew. Each nut has a flange 128 and 130 that attaches to a flange 38 on the pivot plate 30. Thus, as the leadscrews rotate to move the elongated nuts to the right (FIG. 6), seat pivots 20 and 22 pivot counterclockwise. That motion pivots the seat back 24 forward.

Other numerous modifications and alternate embodiments will occur to those skilled in the art. Therefore, applicant intends that the invention be limited only in terms of the appended claims.

I claim:

1. A seat adjustment mechanism comprising:
   a. a handle mounted for rotation with respect to a seat;
   b. a pair of pinion gears driven by rotation of the handle;
   c. a pair of output members, each connected to one of the pinion gears and rotating in response to gear rotation;
   d. a rotation to linear converter extending between each output member and a portion of the seat, the converter applying a force to the portion of the seat in response to rotation of the output members.

2. The seat adjustment mechanism of claim 1 wherein the handle has an internal gear and each pinion gear engages the internal gear.

3. The seat adjustment mechanism of claim 1 wherein each output member is a flexible shaft.

4. The seat adjustment mechanism of claim 1 wherein the rotation to linear converter comprises a, leadscrew driven by the output member and a mating threaded receiver connected to a portion of the seat.

5. The seat adjustment mechanism of claim 1 wherein the handle has an internal gear, a bracket the handle rotating with respect to the bracket, each pinion gear being mounted to the bracket and positioned to engage the internal gear.

6. The seat adjustment mechanism of claim 5 further comprising a block opposite the handle from the bracket, the block having openings through the block aligned with the pinion gears.

7. The seat adjustment mechanism of claim 6 further comprising surfaces at the openings in the block for receiving a portion of the pinion gear for guiding pinion gear rotation.

8. The seat adjustment mechanism of claim 5 wherein the bracket has openings, the pinion gears received in the openings and output members extending through the openings in the bracket to the pinion gears.

9. A vehicle seat comprising:
   a. a seating portion and a seat back having a pair of pivots for pivoting the seat back relative to the seat portion;
   b. a frame fixed to the seating portion;
   c. a handle mounted for rotation relative to the frame;
   d. a pair of pinion gears driven by rotation of the handle;
   e. a pair of output members, each connected to one of the pinion gears and rotating in response to gear rotation;
   f. a rotation to linear converter extending between each output member and a the seat pivots, the converter applying a force to the seat pivot in response to rotation of the output members.

* * * * *